(12) United States Patent
Li (10) Patent No.: US 12,444,061 B2
(45) Date of Patent: Oct. 14, 2025

(54) TARGET TRACKING METHOD, TARGET TRACKING SYSTEM AND ELECTRONIC DEVICE

(71) Applicant: BOE Technology Group Co., Ltd., Beijing (CN)

(72) Inventor: Fei Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/273,791

(22) PCT Filed: Jul. 1, 2022

(86) PCT No.: PCT/CN2022/103242
§ 371 (c)(1),
(2) Date: Jul. 24, 2023

(87) PCT Pub. No.: WO2024/000558
PCT Pub. Date: Jan. 4, 2024

(65) Prior Publication Data
US 2024/0404084 A1  Dec. 5, 2024

(51) Int. Cl.
*G06K 9/00* (2022.01)
*G06T 7/262* (2017.01)
(52) U.S. Cl.
CPC .... *G06T 7/262* (2017.01); *G06T 2207/10016* (2013.01)
(58) Field of Classification Search
CPC ........ G06V 10/88; G06V 40/20; G06V 20/52; G06V 10/751; G06V 20/54; G06V 20/53;
(Continued)

(56) References Cited

U.S. PATENT DOCUMENTS

2020/0250832 A1  8/2020  Li
2022/0254164 A1*  8/2022  Sakai .................. G06T 7/20
2025/0046342 A1*  2/2025  Qiu ..................... G06T 7/246

FOREIGN PATENT DOCUMENTS

CN  106803265 A     6/2017
CN  107292911 A  * 10/2017 ............. G06T 7/246
(Continued)

OTHER PUBLICATIONS

International Search Report for PCT/CN2022/103242 Mailed Oct. 8, 2022.

*Primary Examiner* — Shervin K Nakhjavan
(74) *Attorney, Agent, or Firm* — Ling Wu; Stephen Yang; Ling and Yang Intellectual Property (57) ABSTRACT

Disclosed are a target tracking method, a target tracking system and an electronic device. The target tracking method includes acquiring N frames of images sequentially, wherein N is an integer and N≥2. The target tracking method further includes: performing target detection on an N-th frame of image to generate a target area; performing optical flow calculation and Kalman Filter prediction on a target area in an (N−1)-th frame of image to generate an optical flow predicted target area and a Kalman Filter predicted target area in the N-th frame of image, respectively; performing a first matching between the target area in the N-th frame of image and the optical flow predicted target area in the N-th frame of image; performing second matching on an unmatched target area in an N-th frame of image and the Kalman Filter predicted target area in the N-th frame of image.

20 Claims, 4 Drawing Sheets

(58) Field of Classification Search
CPC .................. G06V 10/757; G06V 10/98; G06T 2207/20084; G06T 7/277; G06T 7/55; G06T 7/579; G06T 7/262; G06T 2207/10016; G06T 7/246
See application file for complete search history.

(56) References Cited

FOREIGN PATENT DOCUMENTS

| | | | | | |
|---|---|---|---|---|---|
| CN | 110415277 | A | | 11/2019 | |
| CN | 111488795 | A | | 8/2020 | |
| CN | 112215155 | A | | 1/2021 | |
| CN | 112528925 | A | * | 3/2021 | ............. G06V 20/53 |
| CN | 112785627 | A | | 5/2021 | |
| CN | 112884804 | A | * | 6/2021 | ............. G06T 7/246 |
| CN | 114092517 | A | | 2/2022 | |

* cited by examiner

TARGET TRACKING METHOD, TARGET TRACKING SYSTEM AND ELECTRONIC DEVICE

CROSS-REFERENCE TO RELATED APPLICATION

The present application is a U.S. National Phase Entry of International Application No. PCT/CN2022/103242 having an international filing date of Jul. 1, 2022. The above-identified application is hereby incorporated by reference.

TECHNICAL FIELD

The present invention relates to the field of video surveillance, in particular to a target tracking method, a target tracking system and an electronic device.

BACKGROUND

Figure 1A:
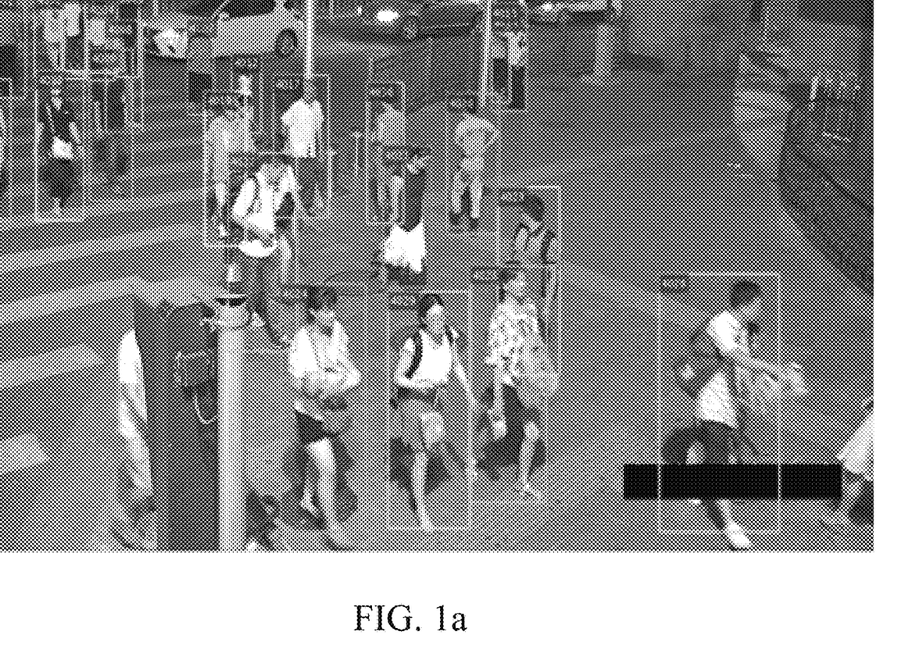
FIGS. 1a and 1b illustrate schematic diagrams of the multi-target tracking in two frames of image.
Figure 1B:
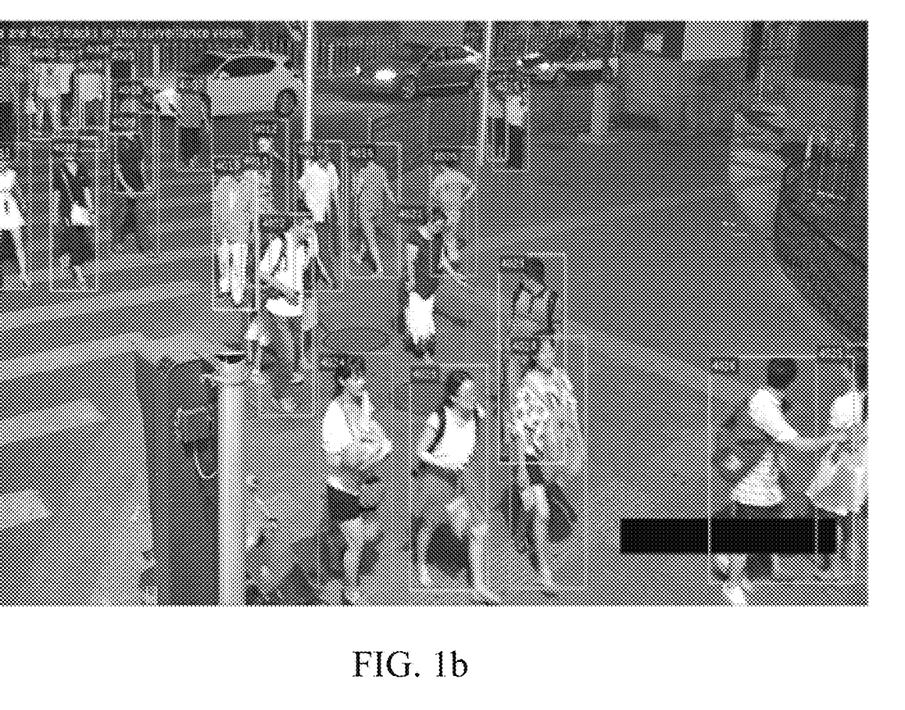

In the field of video surveillance, target tracking is an important and fundamental technology indispensably in an application of intelligent recognition technology, and its tracking effect directly affects the accuracy of intelligent recognition. On the other hand, stable tracking can also reduce repetitive consumption of computing resources to a certain extent. The target tracking includes multi-target tracking and single target tracking. As shown in FIGS. 1a and 1b, FIGS. 1a and 1b illustrate schematic diagrams of the multi-target tracking in two frames of image.

The multi-target tracking is applied in almost every aspect of visual field, such as the field of security and protection, the field of autonomous driving and the field of medical treatment. In the field of security and protection, tracking is usually needed to count people in a specific area. In the field of autonomous driving, tracking is usually needed to predict a trajectory of pedestrians or vehicles. In the field of medical treatment, tracking is usually needed to learn a movement of cells.

In existing technologies, Simple Online and Realtime Tracking (SORT for short) is a commonly used target tracking algorithm. In the SORT tracking algorithm, Faster Region-based Convolutional Neural Network (Faster-RCNN) is used to detect and obtain a target in a video sequence, a Kalman Filter is used to predict information on a possible position of the target in a next frame, and a Hungarian method is used to solve a cost matrix of an Intersection Over Union (IOU for short) between a boundary box of each detected new target and all predicted boundary boxes of the target in an existing trajectory, so as to achieve data association. The IOU means a ratio of intersection to union. Specifically, it is a ratio of intersection to union between the target predicting boundary box and the real boundary box, that is, an intersection over union, which is used to evaluate a positioning accuracy of objects. An IOU algorithm is used to calculate the intersection over union.

The SORT tracking algorithm has advantages of low complexity, simple frame structure and fast running speed, so that the algorithm is widely used. However, the SORT tracking algorithm is characterized in that the SORT tracking algorithm only focuses on the IOU matching between two adjacent frames and relies heavily on detection results, and is easy to cause a jump of a tracking ID number due to a missing detection of target detection, so the SORT tracking algorithm cannot implement effective tracking. On the other hand, matching only relying on the IOU can easily lead to an exchange of trace object IDs.

Target tracking also includes a sparse optical flow method, which is dedicated to register sparse points in the image, that is, given several points (generally corner points) on a reference image, and to find their corresponding points in a current image. Because of its small computation, it is often used for image registration and target tracking.

SUMMARY

Embodiments of the present disclosure provide a target tracking method, a target tracking system, and an electronic device.

In a first aspect, a target tracking method is provided in an embodiment of the present disclosure, which includes: acquiring N frames of image sequentially, wherein N is an integer greater than or equal to 2; the target tracking method further includes: performing target detection on an N-th frame of image by a target detection algorithm to generate a target area; performing optical flow calculation on a target area in an (N−1)-th frame of image to generate an optical flow predicted target area in the N-th frame of image; performing Kalman Filter prediction on the target area in the (N−1)-th frame of image to generate a Kalman Filter predicted target area in the N-th frame of image; performing a first matching between the target area in the N-th frame of image and the optical flow predicted target area in the N-th frame of image; updating a Kalman Filter model and performing optical flow point resampling for a target area in the N-th frame of image which passes the first matching, in response to the target area in the N-th frame of image being matched with the optical flow predicted target area in the N-th frame of image; performing second matching between a target area in an N-th frame of image which does not pass the first matching and the Kalman Filter predicted target area in the N-th frame of image, in response to the unmatch between the target area in the N-th frame of image and the optical flow predicted target area in the N-th frame of image; updating the Kalman Filter model and performing the optical flow point resampling for a target area in the N-th frame of image which passes the second matching, in response to the target area in the N-th frame of image which does not pass the first matching being matched with the Kalman Filter predicted target area in the N-th frame of image; creating and initializing a Kalman motion model for a target area in the N-th frame of image which does not pass the first matching or the second matching, and performing optical flow point sampling, in response to the unmatch between the target area of the N-th frame in image that does not pass the first matching and the Kalman Filter predicted target area in the N-th frame of image; performing prediction condition determination on an Kalman Filter predicted target area in the N-th frame of image which does not pass the second matching; deleting the Kalman motion model in response to a determination being that the prediction condition is not met; and updating the Kalman Filter model and performing the optical flow point resampling by using the optical flow predicted target area in the N-th frame of image corresponding to the Kalman Filter predicted target area in the N-th frame of image which does not pass the second matching, in response to the determination being that the prediction condition is met; wherein, the Kalman Filter predicted target area in the N-th frame of image which does not pass the second matching and the corresponding optical flow predicted target area in the N-th frame of image correspond to a same target.

In some embodiments of the present disclosure, the target tracking method further includes: acquiring a first frame of image; performing target detection on the first frame of image by the target detection algorithm to generate a target area; performing the optical flow point sampling on the target area in the first frame of image, and creating and initializing a Kalman motion model for the target area in the first frame of image.

In some embodiments of the present disclosure, the target detection algorithm is You Only Look Once 5 (yolov5), Single Shot Mutibox Detector (SSD) or Faster-RCNN.

In some embodiments of the present disclosure, performing optical flow calculation on the target area in the (N−1)-th frame of image to generate the optical flow predicted target area in the N-th frame of image includes calculating an optical flow vector at a sampling point in the target area in the (N−1)-th frame of image using a forward optical flow calculation and a reverse optical flow calculation, wherein optical flow vectors less than a first distance threshold are averaged to be an optical flow prediction vector in the optical flow predicted target area in the N-th frame of image.

In some embodiments of the present disclosure, performing optical flow calculation on the target area in the (N−1)-th frame of image to generate the optical flow predicted target area in the N-th frame of image includes calculating an optical flow vector in the optical flow predicted target area in the N-th frame of image and deleting an optical flow predicted target area in which the optical flow vector is greater than a second distance threshold.

In some embodiments of the present disclosure, performing the first matching between the target area in the N-th frame of image and the optical flow predicted target area in the N-th frame of image includes comparing an overlap between the target areas in the N-th frame of image and the optical flow predicted target area in the N-th frame of image using an IOU algorithm.

In some embodiments of the present disclosure, performing the second matching between the target area in the N-th frame of image which does not pass the first matching and the Kalman Filter predicted target area in the N-th frame of image includes comparing an overlap between the target area in the N-th frame of image which does not pass the first matching and the Kalman Filter predicted target area in the N-th frame of image using an IOU algorithm.

In some embodiments of the present disclosure, the prediction condition is that the optical flow vector is less than the first distance threshold for the optical flow predicted target area in the N-th frame of image corresponding to the Kalman Filter predicted target area in the N-th frame of image that does not pass the second matching.

In some embodiments of the present disclosure, the prediction condition is that the optical flow vector is less than the second distance threshold for the optical flow predicted target area in the N-th frame of image corresponding to the Kalman Filter predicted target area in the N-th frame of image that does not pass the second matching.

In some embodiments of the present disclosure, performing the target detection on the N-th frame of image by the target detection algorithm to generate the target area, includes performing target detection on the N-th frame of image by a CNN target detector with the target detection algorithm to generate the target area.

In a second aspect, a target tracking system is provided in an embodiment of the present disclosure, which includes: a camera configured to sequentially acquire N frames of images, where N is an integer greater than or equal to 2; a target detector connected with the camera and configured to perform target detection on an N-th frame of image by a target detection algorithm to generate a target area; an optical flow prediction module, which is connected to the camera and the target detector and configured to perform optical flow calculation on a target area in an (N−1)-th frame of image to generate an optical flow predicted target area in the N-th frame of image; a Kalman prediction module, which is connected with the camera and the target detector, and configured to perform Kalman Filter prediction on a target area in the (N−1)-th frame of image to generate a Kalman Filter predicted target area in the N-th frame of image; a first matching module, which is connected with the target detector, the optical flow prediction module and the Kalman prediction module, and is configured to perform first matching between the target area in the N-th frame of image from the target detector and the optical flow predicted target area in the N-th frame of image from the optical flow prediction module; the first matching module is further configured to output a target area in the N-th frame of image which passes the first matching to update an Kalman Filter model and perform optical flow point resampling, in response to the target area in the N-th frame of image being matched with the optical flow predicted target area in the N-th frame of image; in response to the unmatch between the target area in the N-th frame of image and the optical flow predicted target area in the N-th frame of image, the first matching module is further configured to output a target area in the N-th frame of image which does not pass the first matching to a second matching module; the second matching module is configured to perform second matching between the target area in the N-th frame of image which does not pass the first matching and the Kalman Filter predicted target area in the N-th frame of image from the Kalman prediction module; in response to the match between the target area in the N-th frame of image which does not pass the first matching and the Kalman Filter predicted target area in the N-th frame of image, the second matching module is further configured to output a target area in the N-th frame of image which passes the second matching, to update the Kalman Filter model and perform the optical flow point resampling; in response to the unmatch between the target area in the N-th frame of image which does not pass the first matching and the Kalman Filter predicted target area in the N-th frame of image, the second matching module is further configured to output a target area in the N-th frame of image which does not pass the first matching or the second matching, to create and initialize a Kalman motion model and perform optical flow point sampling; the second matching module is further configured to output the Kalman Filter predicted target area in the N-th frame of image which does not pass the second matching to a determination module, and the determination module is configured to make a prediction condition determination; the determination module is further configured to delete the Kalman motion model in response to a determination being that the prediction condition is not met; in response to the determination being that the prediction condition is met, the determination module is further configured to update the Kalman Filter model and perform the optical flow point resampling by using the optical flow predicted target area in the N-th frame of image which is from the optical flow prediction module and corresponds to the Kalman Filter predicted target area in the N-th frame of image which does not pass the second matching. Wherein the Kalman Filter predicted target area in the N-th frame of image which does not pass the second matching and the corresponding optical flow predicted target area in the N-th frame of image correspond to a same target.

In some embodiments of the present disclosure, the camera is further configured to acquire a first frame of image; the target detector is further configured to receive the first frame of image and perform target detection on the first frame of image by the target detection algorithm to generate a target area; the optical flow prediction module is further configured to perform optical flow point sampling on the target area in the first frame of image from the target detector, and the Kalman prediction module is further configured to create and initialize a Kalman motion model for the target area in the first frame of image from the target detector.

In some embodiments of the present disclosure, the target detection algorithm is yolov5, SSD or Faster-RCNN.

In some embodiments of the present disclosure, the optical flow prediction module is further configured to calculate an optical flow vector at a sampling point in the target area in the (N−1)-th frame of image using a forward optical flow calculation and a reverse optical flow calculation, wherein optical flow vectors less than a first distance threshold is averaged to be an optical flow prediction vector in the optical flow predicted target area in the N-th frame of image.

In some embodiments of the present disclosure, the optical flow prediction module is further configured to calculate the optical flow vector in the optical flow predicted target area in the N-th frame of image, and delete an optical flow predicted target area in which the optical flow vector is greater than the second distance threshold.

In some embodiments of the present disclosure, the first matching module is further configured to compare an overlap between the target areas in the N-th frame of image and the optical flow predicted target area in the N-th frame of image using an IOU algorithm.

In some embodiments of the present disclosure, the second matching module is further configured to compare an overlap between the target area in the N-th frame of image which does not pass the first matching and the Kalman Filter predicted target area in the N-th frame of image using an IOU algorithm.

In some embodiments of the present disclosure, the prediction condition is that the optical flow vector is less than the first distance threshold for the optical flow predicted target area in the N-th frame of image corresponding to the Kalman Filter predicted target area in the N-th frame of image that does not pass the second matching.

In some embodiments of the present disclosure, the prediction condition is that the optical flow vector is less than the second distance threshold for the optical flow predicted target area in the N-th frame of image corresponding to the Kalman Filter predicted target area in the N-th frame of image that does not pass the second matching.

In some embodiments of the present disclosure, the target detector is a CNN target detector.

In a third aspect, an electronic device is provided in an embodiment of the present disclosure, which includes a memory, a processor, and a computer program stored on the memory and operable on the processor, wherein when the computer program is executed by the processor, the target tracking method of any one of the embodiments in the first aspect is implemented.

According to the target tracking method, the target tracking system and the electronic device provided in the embodiments of the present disclosure, the SORT tracking algorithm and the sparse optical flow method are combined to effectively solve the problem of tracking failure caused by tracking ID switching and missing detection due to the simple IOU matching in the SORT. At the same time, when detection effect is poor caused by flickers, the problem can also be effectively remedied, thereby improving the tracking stability and making the tracking effect does not rely heavily on the detection effect.

BRIEF DESCRIPTION OF DRAWINGS

According to various disclosed embodiments, the following drawings are only examples for illustrative purposes and are not intended to limit the scope of the present invention.

DETAILED DESCRIPTION

The present disclosure will now be described in more detail with reference to the following embodiments. It should be noted that the following description of some embodiments presented herein is for purposes of illustration and description only. It is not exhaustive or limited to the precise form disclosed.

It should be noted that, unless otherwise defined, technical terms or scientific terms used in one or more embodiments of the present disclosure shall have a general meaning understood by those skilled in the art to which the present disclosure pertains. Wordings such as "first", "second" and the like used in one or more embodiments of the present disclosure do not represent any order, quantity, or importance, but are only used to distinguish different components. "comprise", "contain", or similar words mean that elements or objects appearing before the words cover elements or objects and their equivalents listed after the words, but do not exclude other elements or objects. "Connect", "join", or a similar term is not limited to a physical or mechanical connection, but may include an electrical connection, whether direct or indirect. "Upper", "lower", "left", "right", etc., are used to represent relative positional relations, and when an absolute position of a described object is changed, the relative positional relation may also be correspondingly changed.

Embodiments of the present disclosure provide a target tracking method, a target tracking system, and an electronic device that substantially eliminate one or more problems caused by limitations and disadvantages of the prior art. In one aspect, a target tracking method is provided in the present disclosure, which includes: acquiring N frames of image sequentially, wherein N is an integer greater than or equal to 2; the target tracking method further includes performing target detection on an N-th frame of image by a target detection algorithm to generate a target area; performing optical flow calculation on a target area in an (N−1)-th frame of image to generate an optical flow predicted target area of the N-th frame of image; performing Kalman Filter prediction on the target area in the (N−1)-th frame of image to generate a Kalman Filter predicted target area in the N-th frame of image; performing a first matching between the target area in the N-th frame of image and the optical flow predicted target area in the N-th frame of image; updating a Kalman Filter model and performing optical flow point resampling for a target area in the N-th frame of image which passes the first matching, in response to the target area in the N-th frame of image being matched with the optical flow predicted target area in the N-th frame of image; performing second matching on a target area in an N-th frame of image which does not pass the first matching and the Kalman Filter predicted target area in the N-th frame of image, in response to the unmatch between the target area in the N-th frame of image and the optical flow predicted target area in the N-th frame of image; updating the Kalman Filter model and performing the optical flow point resampling for a target area in the N-th frame of image which passes the second matching, in response to the target area in the N-th frame of image which does not pass the first matching being matched with the Kalman Filter predicted target area in the N-th frame of image; creating and initializing a Kalman motion model for a target area in the N-th frame of image which does not pass both of the first matching and the second matching, and performing optical flow point sampling, in response to the unmatch between the target area of the N-th frame in image that does not pass the first matching and the Kalman Filter predicted target area in the N-th frame of image; performing prediction condition determination on an Kalman Filter predicted target area in the N-th frame of image which does not pass the second matching; deleting the Kalman motion model in response to a determination that the prediction condition is not met; and updating the Kalman Filter model and performing the optical flow point resampling by using the optical flow predicted target area in the N-th frame of image corresponding to the Kalman Filter predicted target area in the N-th frame of image which does not pass the second matching, in response to the determination that the prediction condition is met; wherein, the Kalman Filter predicted target area in the N-th frame of image which does not pass the second matching and the corresponding optical flow predicted target area in the N-th frame of image correspond to a same target.

Figure 2:
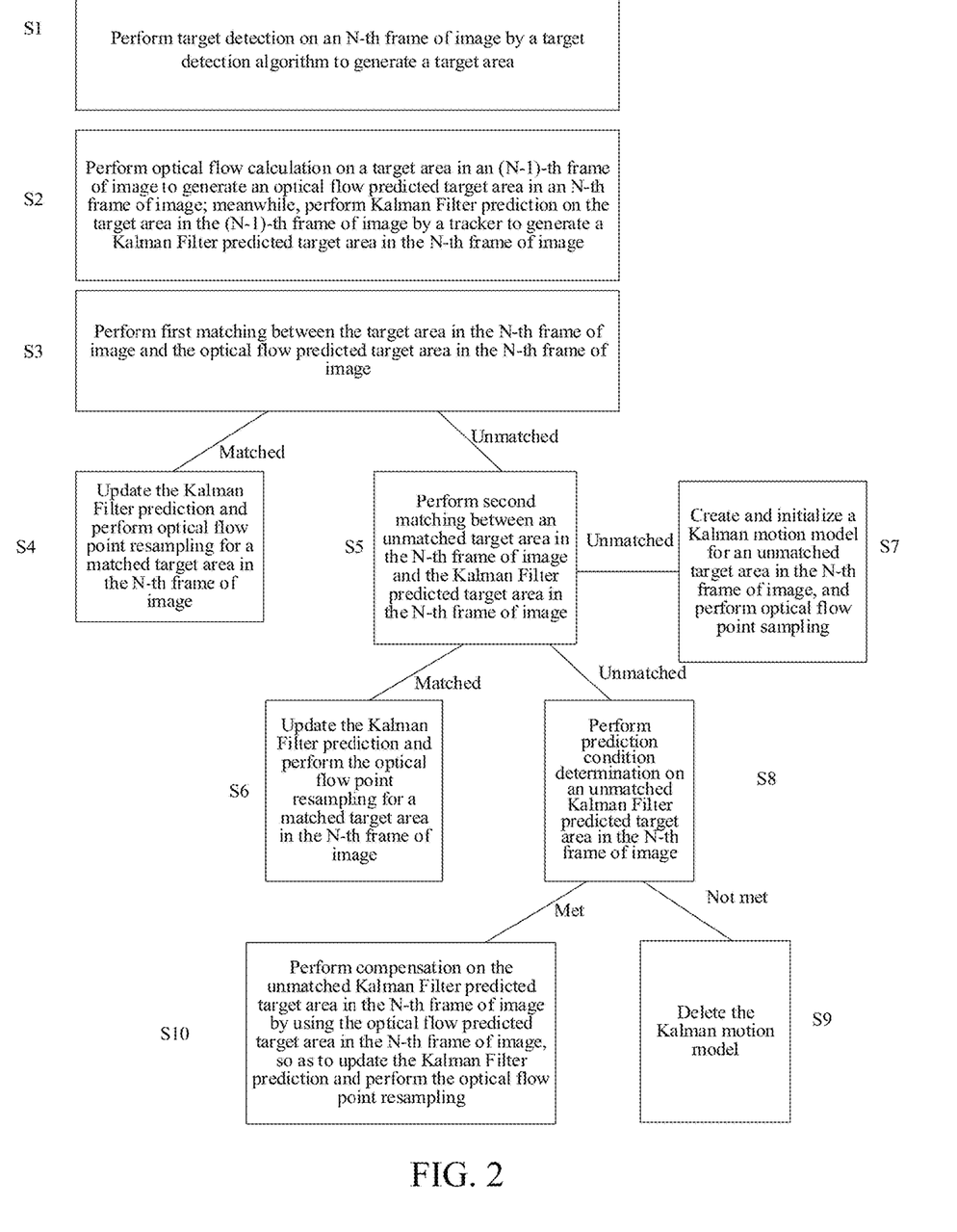
FIG. 2 is a flowchart of a target tracking method according to an embodiment of the present disclosure.

In a first aspect, a target tracking method is provided in an embodiment of the present disclosure. FIG. 2 is a flowchart of a target tracking method provided in an embodiment of the present disclosure. As shown in FIG. 2, the target tracking method provided in the embodiment of the present disclosure includes acquiring N frames of image sequentially, wherein N is an integer greater than or equal to 2, wherein the target tracking method further includes acts S1 to S10.

In act S1, target detection is performed on an N-th frame of image by a target detection algorithm to generate a target area (e.g., a target rectangular frame).

Specifically, in some embodiments of the present disclosure, target detection is performed on the N-th frame of image by a target detector with the target detection algorithm to generate the target area. Then, each target is sampled at interval of a preset sampling step length S, so as to obtain sampling points. In a specific implementation process, the sampling step length S can be adjusted according to specific computing resources and a dimension of the target. In some embodiments of the present disclosure, S defaults to 10. In a case of S being less than 10, a median value of a target rectangle is taken. For example, in a case where a width of the target area is 8 pixels, sampling is performed only at a point of S=4 (i.e. only at a midpoint in the target area).

In addition, in some embodiments of the present disclosure, a ratio array R [ ] is obtained by calculating a distance between two points in a t-th frame of image and a distance between two corresponding points in a (t+1)-th frame, and a scaling ratio of the target area in the current frame is obtained by taking the median value of R, thereby accomplishing a position and dimension prediction of the target in the current frame. Herein, t is an integer greater than or equal to 1 and less than N. For example, a distance between the two sampling points in the t-th frame is 10 pixels, and a distance between the two sampling points in the (t+1)-th frame is 4 pixels, thereby determining the scaling ratio of the target area in the current frame.

In some embodiments of the present disclosure, the target detector uses a target detection algorithm, such as yolov5, SSD or Faster-RCNN.

In some embodiments of the present disclosure, a sampling method may be implemented in an edge computing device. The sampling step length S can be varied according to specific requirements for the computation amount and the real-time. At the same time, to ensure an speed, two scales or a single scale are used to predict an optical flow, such that a trade-off between a tracking effect and an operational speed of the algorithm can be achieved.

In act S2, optical flow calculation is performed on a target area in an (N−1)-th frame of image to generate an optical flow predicted target area (optical flow predicted result) in an N-th frame of image; Kalman Filter prediction is performed on the target area in the (N−1)-th frame of image to generate a Kalman Filter predicted target area in the N-th frame of image (Kalman Filter predicted result);

In some embodiments of the present disclosure, a specific process of performing optical flow calculation on the target area in the (N−1)-th frame of image to generate the optical flow predicted target area (optical flow predicted result) of the N-th frame of image are as follows: performing tracking prediction according to the sampling points in the act S1. At first, given a sequence of images and a time t, a position of the sampling point at a time (t+1) is located. Let S=(I [t], I [t+1], . . . , I [t+k]) be a sequence of images. To ensure the accuracy of optical flow prediction, two optical flow calculations (i.e., a forward optical flow calculation and a reverse optical flow calculation) are used in the present disclosure to calculate an optical flow vector at the sampling point. Let a position of the sampling point at the time t be x[t], a tracking algorithm is used to perform forward tracking (i.e., forwardly calculating the optical flow vector) according to the following formula: T[k,f]=(x[t], x[t+1]), where f represents forward optical flow calculation. Then, using a calculated position x[t+1] to perform backward tracking (i.e., reversely calculating the optical flow vector) to x[t], such that a verification trajectory T[k,b]=(x'[t], x'[t+1]) is generated, where b represents backward optical flow calculation. Ideally, an optical flow prediction point (optical flow predicted target area) calculated reversely should coincide with the sampling point at the time t. Based on this, an error of the prediction point is obtained as follow:

$$FB(T_b^f | S) = \text{distance}(T_f^{t+1}, T_b^t)$$

By calculating an Euclidean distance of corresponding points of the optical flows twice, an error array FB [ ] is obtained. A median value of FB [ ] is calculated as a first distance threshold, and an optical flow vector at a prediction point (the optical flow predicted target area) greater than the first distance threshold is deleted. Then, optical flow vectors at prediction points less than the first distance threshold are averaged as an optical flow prediction vector of the current frame to predict a next moving direction of the target.

In some embodiments of the present disclosure, the first distance threshold described above is not limited to the median value of FB [ ]. In other embodiments of the present disclosure, the first distance threshold may be set as needed.

Alternatively, in some embodiments of the present disclosure, performing optical flow calculation on the target area in the (N−1)-th frame of image to generate the optical flow predicted target area in the N-th frame of image includes calculating an optical flow vector in the optical flow predicted target area in the N-th frame of image and deleting an optical flow predicted target area in which the optical flow vector is greater than a second distance threshold.

In some embodiments of the present disclosure, when the calculated optical flow vector in the optical flow predicted target area in the N-th frame of image is greater than the second distance threshold, a moving speed of the sampling points in the N-th frame of image and the (N−1)-th frame of image is considered to be too high and unreasonable, and therefore the prediction point (optical flow predicted target area) is deleted. A prediction point where the calculated optical flow vector in the optical flow predicted target area in the N-th frame of image is less than the second distance threshold is reserved.

In some embodiments of the present disclosure, the second distance threshold may be set as needed.

In some embodiments of the present disclosure, calculating the optical flow vector at the sampling point is not limited to the two optical flow calculations (i.e., the forward optical flow calculation and the reverse optical flow calculation) employed in the embodiment of the present disclosure. In other embodiments of the present disclosure, other methods may be used to calculate the optical flow vector at the sampling point. The other methods may be set as needed, which is not limited herein.

In some embodiments of the present disclosure, performing the optical flow calculation on the target area in the (N−1)-th frame of image to generate the optical flow predicted target area (optical flow predicted result) in the N-th frame of image and performing Kalman Filter prediction on the target area in the (N−1)-th frame of image to generate the Kalman Filter predicted target area in the N-th frame of image (Kalman Filter predicted result) occur concurrently. However, the present disclosure is not limited thereto. In other embodiments of the present disclosure, the two acts may not occur concurrently.

In act S3, first matching is performed between the target area in the N-th frame of image and the optical flow predicted target area in the N-th frame of image. If the target area in the N-th frame of image matches the optical flow predicted target area in the N-th frame of image, the method proceeds to act S4. If the target area in the N-th frame of image does not match the optical flow predicted target area in the N-th frame of image, the method proceeds to act S5.

In some embodiments of the present disclosure, performing the first matching between the target area in the N-th frame of image and the optical flow predicted target area in the N-th frame of image includes comparing an overlap between the target area in the N-th frame of image and the optical flow predicted target area in the N-th frame of image (i.e. performing an Intersection Over Union (IOU for short) matching between the target area in the N-th frame of image and the optical flow predicted target area in the N-th frame of image).

Specifically, in some embodiments of the present disclosure, a cost matrix is calculated based on the overlap (i.e., the IOU) between the target area in the N-th frame of image and the optical flow predicted target area in the N-th frame of image, and then the calculated cost matrix is processed using a weighted Hungarian method to perform the first matching between the target area in the N-th frame of image and the optical flow predicted target area in the N-th frame of image.

For example, there are three target areas A1, B1 and C1 in the target area in the N-th frame of image. Correspondingly, there are three target areas A2, B2 and C2 in the optical flow predicted target areas in the N-th frame of image. Intersection Over Unions (IOU's for short) of the target area A1 and each of the three target areas A2, B2 and C2 in the optical flow predicted target area in the N-th frame of image are calculated respectively. Intersection Over Unions (IOU's for short) of the target B1 and each of the three target areas A2, B2 and C2 in the optical flow predicted target area in the N-th frame of image are calculated respectively. Intersection Over Unions (IOU's for short) of the target area C1 and the three target areas A2, B2 and C2 in the optical flow predicted target area in the N-th frame of image are calculated respectively. Therefore, 9 values are obtained, thus forming a cost matrix. Then, the weighted Hungarian method is used to process the calculated cost matrix, so as to obtain an optimal matching pair between the target area in the N-th frame of image and the optical flow predicted target area in the N-th frame of image.

In some embodiments of the present disclosure, the weighted Hungarian method is used to obtain an optimal matching pair, so that an optimal solution can be obtained for each pair of target areas formed by each target area in the target area in the N-th frame of image and a corresponding target area in the optical flow predicted target area in the N-th frame of image.

In the act S4, for a matched target area in the N-th frame of image (the target area in the N-th frame of image according to the first matching), a Kalman Filter model is updated and optical flow point resampling is performed.

In some embodiments of the present disclosure, updating the Kalman Filter model and performing the optical flow point resampling for the matched target area in the N-th frame of image means that the optical flow calculation is performed on the matched target area in the N-th frame of image to generate an optical flow predicted target area (optical flow predicted result) in the (N+1)-th frame of image, and the Kalman Filter prediction is performed on the matched target area in the N-th frame of image to generate a Kalman Filter predicted target area (Kalman Filter predicted result) in the (N+1)-th frame of image.

In the act S5, second matching is performed on an unmatched target area in the N-th frame of image (the target area in the N-th frame of image which does not pass the first matching) and the Kalman Filter predicted target area in the N-th frame of image. If the unmatched target area in the N-th frame of image matches the Kalman Filter predicted target area in the N-th frame of image, the method proceeds to act S6. If the unmatched target area in the N-th frame of image does not match the Kalman Filter predicted target area in the N-th frame of image, the method proceeds to acts S7 and S8.

In some embodiments of the present disclosure, performing the second matching on the unmatched target area in the N-th frame of image with the Kalman Filter predicted target area in the N-th frame of image includes comparing an overlap between the unmatched target area in the N-th frame of image and the Kalman Filter predicted target area in the N-th frame of image (i.e. performing IOU matching on the unmatched target area in the N-th frame of image and the Kalman Filter predicted target area in the N-th frame of image).

Specifically, in some embodiments of the present disclosure, a cost matrix is calculated based on the overlap (i.e., the IOU) between the unmatched target area in the N-th frame of image and the Kalman Filter predicted target area in the N-th frame of image, and then the calculated cost matrix is processed using a weighted Hungarian method to perform the second matching between the unmatched target area in the N-th frame of image and the Kalman Filter predicted target area in the N-th frame of image.

For example, there are three target areas A1, B1 and C1 in the unmatched target area in the N-th frame of image, and correspondingly, there are three target areas A2, B2 and C2 in the Kalman Filter predicted target area in the N-th frame of image. Intersection Over Unions (IOU's for short) of the target area A1 and each of the three target areas A2, B2 and C2 in the Kalman Filter predicted target area in the N-th frame of image are calculated respectively. Intersection Over Unions (IOU's for short) of the target area B1 and each of the three target areas A2, B2 and C2 in the Kalman Filter predicted target area in the N-th frame of image are calculated respectively. Intersection Over Unions (IOU's for short) of the target area C1 and each of the three target areas A2, B2 and C2 in the Kalman Filter predicted target area in the N-th frame of image are calculated respectively. Therefore, 9 values are obtained, thus forming a cost matrix. Then, the weighted Hungarian method is used to process the calculated cost matrix, so as to obtain an optimal matching pair between the unmatched target area in the N-th frame of image and the Kalman Filter predicted target area in the N-th frame of image.

In some embodiments of the present disclosure, the second matching is mainly to ensure that the IOU matching predicted by the Kalman Filter is still reserved in a case of failure of optical flow point prediction, thereby ensuring a tracking recall rate.

In some embodiments of the present disclosure, associated algorithms used in a sparse optical flow method may be implemented in CUDA™ (Compute Unified Device Architecture), introduced by NVIDIA Corporation. The compute unified device architecture can achieve a dense optical flow prediction method which needs more computation amount and consumes more resources than the sparse optical flow method, and can calculate an optical flow vector at all pixels in the target area and perform optical flow prediction. Furthermore, in order to avoid from a problem that an optical flow is easy to fail at a high speed, the compute unified device architecture can predict the optical flow with a plurality of scales to ensure the accuracy of optical flow prediction and an operational speed of the algorithm.

In the act S6, for a matched target area in the N-th frame of image (the target area in the N-th frame of image according to the second matching), the Kalman Filter model is updated and the optical flow point resampling is performed.

In some embodiments of the present disclosure, updating the Kalman Filter model and performing the optical flow point resampling for the matched target area in the N-th frame of image means that the optical flow calculation is performed on the matched target area in the N-th frame of image to generate an optical flow predicted target area (optical flow predicted result) in the (N+1)-th frame of image, and the Kalman Filter prediction is performed on the matched target area in the N-th frame of image to generate a Kalman Filter predicted target area (Kalman Filter predicted result) in the (N+1)-th frame of image.

In act S7, a Kalman motion model is created and initialized for an unmatched target area in the N-th frame of image (i.e., a target area in the N-th frame of image which does not pass the first matching and the second matching, and the target is considered to be a new target because the target is not matched in the two matching operations), and optical flow point sampling is performed.

In act S8, prediction condition determination is performed on an unmatched Kalman Filter predicted target area in the N-th frame of image (an Kalman Filter predicted target area in the N-th frame of image which does not pass the second matching). If a determination is that a prediction condition is not met, the method proceeds to act S9. If the determination is that the prediction condition is met, the method proceeds to act S10.

In some embodiments of the present disclosure, performing the prediction condition determination on the unmatched Kalman Filter predicted target area in the N-th frame of image includes performing a prediction condition determination on an optical flow predicted target area in the N-th frame of image corresponding to the unmatched Kalman Filter predicted target area in the N-th frame of image, wherein the unmatched Kalman Filter predicted target area in the N-th frame of image and the optical flow predicted target area in the N-th frame of image correspond to a same target.

Specifically, in the optical flow predicted result of the optical flow predicted target area in the N-th frame of image, if the optical flow vector at the sampling point calculated by two optical flow calculations (i.e., the forward optical flow calculation and the reverse optical flow calculation) is greater than the first distance threshold which is a median value of an error FB [ ] at the prediction point, the optical flow predicted target area in the N-th frame of image corresponding to the unmatched Kalman Filter predicted target area in the N-th frame of image is considered not to meet the prediction condition; if the optical flow vector at the sampling point calculated by the two optical flow calculations (i.e., the forward optical flow calculation and the reverse optical flow calculation) is less than the first distance threshold, the optical flow predicted target area in the N-th frame of image corresponding to the unmatched Kalman Filter predicted target area in the N-th frame of image is considered to meet the prediction condition.

Alternatively, in some embodiments of the present disclosure, the optical flow vector in the optical flow predicted target area in the N-th frame of image is calculated, and an optical flow predicted target area in which the optical flow vector is greater than the second distance threshold is deleted. In some embodiments of the present disclosure, if the calculated optical flow vector in the optical flow predicted target area in the N-th frame of image is greater than the second distance threshold, the optical flow predicted target area in the N-th frame of image corresponding to the unmatched Kalman Filter predicted target area in the N-th frame of image is considered not to meet the prediction condition; if the calculated optical flow vector in the optical flow predicted target area in the N-th frame of image is less than the second distance threshold, the optical flow predicted target area in the N-th frame of image corresponding to the unmatched Kalman Filter predicted target area in the N-th frame of image is considered to meet the prediction condition.

In the act S9, the Kalman motion model is deleted.

In some embodiments of the present disclosure, the Kalman motion model is deleted if the determination is that the prediction condition is not met. However, the present disclosure is not limited thereto. In other embodiments of the present disclosure, if the determination is that the prediction condition is not met, a lifetime of the Kalman motion model is increased by 1. When the lifetime of Kalman motion model is greater than a certain threshold, the Kalman motion model is deleted.

In the act S10, the Kalman Filter model is updated and the optical flow point resampling is performed by using the optical flow predicted target area in the N-th frame of image corresponding to the unmatched Kalman Filter predicted target area in the N-th frame of image (the Kalman Filter predicted target area in the N-th frame of image which does not pass the second matching).

In some embodiments of the present disclosure, updating the Kalman Filter model and performing the optical flow point resampling by using the optical flow predicted target area in the N-th frame of image corresponding to the unmatched Kalman Filter predicted target area in the N-th frame of image means that the optical flow calculation is performed on the optical flow predicted target area in the N-th frame of image to generate an optical flow predicted target area (optical flow predicted result) in the (N+1)-th frame of image, and the Kalman Filter prediction is performed on the matched target area in the N-th frame of image to generate a Kalman Filter predicted target area (Kalman Filter predicted result) in the (N+1)-th frame of image.

In some embodiments of the present disclosure, the target detector is a Convolutional Neural Network (CNN for short) target detector.

In some optional implementations of the present embodiment, the target detector may be obtained by training a preset Convolutional Neural Network (CNN for short). The convolutional neural network may be a multi-layer convolutional neural network which is untrained or is being trained. The convolutional neural network may include, for example, a convolution layer, a pooling layer, a full connection layer and a loss layer. In addition, a non-first convolution layer in the convolutional neural network may be connected with at least one convolution layer that precedes the non-first convolution layer. For example, the non-first convolution layer may be connected with all convolution layers that precede it to enable selection of a first convolution layer. The non-first convolution layer may be connected with a partial convolution layer that precedes the non-first convolution layer.

In some embodiments of the present disclosure, the target tracking method further includes acquiring a first frame of image; detecting target in the first frame of image by a target detection algorithm to generate a target area (e.g., target rectangular frame), performing the optical flow point sampling on the target area, and creating and initializing the Kalman motion model.

In some embodiments of the present disclosure, the acts S1 to S10 described above are performed on each of the N frames of image, where N is an integer greater than or equal to 2, thereby accomplishing tracking for a plurality of targets in a video stream.

In some embodiments of the present disclosure, sufficient correlation of tracking in two adjacent frames can be ensured by performing the second matching.

In some embodiments of the present disclosure, optical flow compensation is performed on the unmatched Kalman Filter predicted target area in the N-th frame of image, and the Kalman Filter model is updated by using the compensated Kalman Filter predicted target area, thereby ensuring the consistency of updating the motion model and improving the tracking stability.

According to the target tracking method provided in the embodiments of the present disclosure, the SORT tracking algorithm and the sparse optical flow method are combined to effectively solve the problem of tracking failure caused by tracking ID switching and missing detection due to the simple IOU matching in the SORT tracking algorithm. At the same time, when detection effect is poor caused by flickers, the problem can also be effectively remedied, thereby improving the tracking stability and making the tracking effect does not rely heavily on the detection effect.

It should be noted that the method in one or more embodiments of the present disclosure may be performed by a single device such as a computer, a server or the like. The method in the embodiments may be applied in a distributed scenario, and is accomplished by cooperation of a plurality of devices. In such case of the distributed scenario, one of the plurality of devices may execute only one or more acts in the method in one or more embodiments of the present disclosure, and the plurality of devices interact with each other to accomplish the method.

Specific embodiments of the present disclosure are described above. Other embodiments fall within the scope of the appended claims. In some cases, actions or acts recorded in the claims may be performed in an order different from those in the embodiments and may still achieve desired results. In addition, processes illustrated in the drawings do not necessarily require a specific order or continuous order illustrated to achieve the desired results. In some embodiments, multitask processing and parallel processing are feasible or possibly advantageous.

Figure 3:
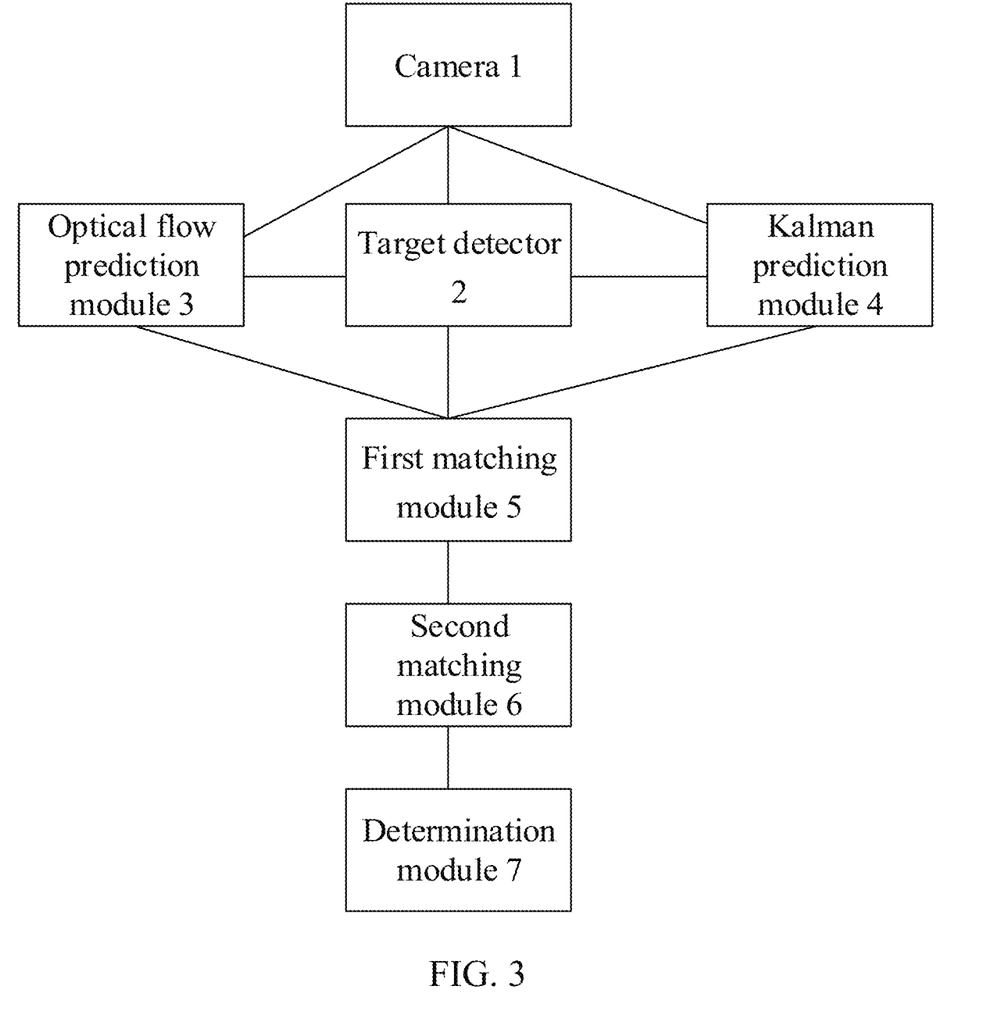
FIG. 3 is a block diagram of a target tracking system according to an embodiment of the present disclosure.

In a second aspect, a target tracking system is provided in an embodiment of the present disclosure. FIG. 3 is a block diagram of a target tracking system according to an embodiment of the present disclosure. As shown in FIG. 3, a target tracking system is provided in an embodiment of the present disclosure, which includes a camera 1 and an target detector 2. The camera 1 is configured to acquire N frames of image sequentially, where N is an integer greater than or equal to 2. The target detector 2 is connected with the camera 1 and configured to perform object detection on an N-th frame of image with an object detection algorithm to generate a target area (e.g. a target rectangular frame).

Specifically, in some embodiments of the present disclosure, target detection is performed on the N-th frame of image by the target detector 2 with the target detection algorithm to generate the target area. Then, each target is sampled at interval with a preset sampling step length S, so as to obtain sampling points. In a specific implementation process, the sampling step length S can be adjusted according to specific computing resources and a dimension of the target. In some embodiments of the present disclosure, S defaults to 10. In a case of S being less than 10, an median value of a target rectangle is taken. For example, in a case where a width of the target area is 8 pixels, sampling is performed only at a point of S=4 (i.e. only at a midpoint in the target area).

In addition, in some embodiments of the present disclosure, a ratio array R [ ] is obtained by calculating a distance between two points in a t-th frame of image and a distance between two corresponding points in a (t+1)-th frame, and a scaling ratio of the target area in the current frame is obtained by taking the median value of R, thereby accomplishing prediction about a position and dimension of the target in the current frame. Herein, t is an integer greater than or equal to 1 and less than N. For example, a distance between the two sampling points in the t-th frame is 10 pixels, and a distance between the two sampling points in the (t+1)-th frame is 4 pixels, thereby determining the scaling ratio of the target area in the current frame.

In some embodiments of the present disclosure, the target detector 2 uses a target detection algorithm, such as yolov5, SSD or Faster-RCNN.

In some embodiments of the present disclosure, a sampling method may be implemented in an edge computing device. The sampling step length S is varied according to specific requirements for the computation and the real-time. At the same time, in order to ensure an efficiency, two scales or a single scale are used to predict an optical flow, such that a trade-off between a tracking effect and an operational efficiency of the algorithm can be achieved.

The target tracking system according to the embodiment of the present disclosure further includes an optical flow prediction module 3 and a Kalman prediction module 4. The optical flow prediction module 3 is connected with the camera 1 and the target detector 2, and is configured to perform optical flow calculation on a target area in an (N−1)-th frame of image to generate an optical flow predicted target area (optical flow predicted result) in the N-th frame of image. The Kalman prediction module 4 is connected with the camera 1 and the target detector 2, and configured to perform Kalman Filter prediction on the target area in the (N−1)-th frame of image to generate a Kalman Filter predicted target area (Kalman Filter predicted result) in the N-th frame of image.

In some embodiments of the present disclosure, performing the optical flow calculation on the target area in the (N−1)-th frame of image to generate the optical flow predicted target area (optical flow predicted result) in the N-th frame of image, and performing Kalman Filter prediction on the target area in the (N−1)-th frame of image to generate the Kalman Filter predicted target area in the N-th frame of image (Kalman Filter predicted result) occur concurrently. However, the present disclosure is not limited thereto. In other embodiments of the present disclosure, the two acts may not occur concurrently.

In some embodiments of the present disclosure, a specific process of performing optical flow calculation on the target area in the (N−1)-th frame of image to generate the optical flow predicted target area (optical flow predicted result) of the N-th frame of image are as follows: performing tracking prediction according to the sampling points in an act S1. At first, given a sequence of images and a time t, a position of the sampling point at a time (t+1) is located. Let S=(I [t], I [t+1], . . . , I [t+k]) be a sequence of images. To ensure the accuracy of optical flow prediction, twice of optical flow calculations (i.e., a forward optical flow calculation and a reverse optical flow calculation) are used in the present disclosure to calculate an optical flow vector at the sampling point. Let a position of the sampling point at the time t be x[t], a tracking algorithm is used to perform forward tracking (i.e., forwardly calculating the optical flow vector) according to the following formula: T[k,f]=(x[t], x[t+1]), where f represents forward optical flow calculation. Then, using a calculated position x[t+1] to perform backward tracking (i.e., reversely calculating optical flow vector) to x[t], such that a verification trajectory T[k,b]=(x' [t], x' [t+1]) is generated, where b represents backward optical flow calculation. Ideally, an optical flow prediction point (optical flow predicted target area) calculated reversely should coincide with the sampling point at the time t. Based on this, an error of the prediction point is obtained as follow:

$$FB\left(T_b^f | S\right) = \text{distance}\left(T_f^{t+1}, T_b^t\right)$$

By calculating an Euclidean distance of corresponding points of the optical flows twice, an error array FB [ ] is obtained. A median value of FB [ ] is calculated as a first distance threshold, and an optical flow vector at a prediction point (the optical flow predicted target area) greater than the first distance threshold is deleted. Then, optical flow vectors at prediction points less than the first distance threshold are averaged as an optical flow prediction vector of the current frame to predict a next moving direction of the target.

In some embodiments of the present disclosure, the first distance threshold described above is not limited to the median value of FB [ ]. In other embodiments of the present disclosure, the first distance threshold may be set as needed.

Alternatively, in some embodiments of the present disclosure, performing optical flow calculation on the target area in the (N−1)-th frame of image to generate the optical flow predicted target area in the N-th frame of image specifically includes calculating an optical flow vector in the optical flow predicted target area in the N-th frame of image and deleting an optical flow predicted target area in which the optical flow vector is greater than a second distance threshold.

In some embodiments of the present disclosure, when the calculated optical flow vector in the optical flow predicted target area in the N-th frame of image is greater than the second distance threshold, a moving speed of the sampling points in the N-th frame of image and the (N−1)-th frame of image is considered to be too high and unreasonable, and therefore the prediction point (optical flow predicted target area) is deleted. A prediction point where the calculated optical flow vector in the optical flow predicted target area in the N-th frame of image is less than the second distance threshold is reserved.

In some embodiments of the present disclosure, the second distance threshold may be set as needed.

In some embodiments of the present disclosure, calculating the optical flow vector at the sampling point is not limited to the twice of optical flow calculations (i.e., the forward optical flow calculation and the reverse optical flow calculation) employed in the embodiment of the present disclosure. In other embodiments of the present disclosure, other methods may be used to calculate the optical flow vector at the sampling point. The other methods may be set as needed, which is not limited herein.

The target tracking system according to the embodiment of the present disclosure further includes a first matching module 5, which is connected with the target detector 2, the optical flow prediction module 3 and the Kalman prediction module 4, and is configured to perform first matching between the target area in the N-th frame of image from the target detector 2 and the optical flow predicted target area in the N-th frame of image from the optical flow prediction module 3.

In some embodiments of the present disclosure, the first matching module 5 is configured to compare an overlap between the target areas in the N-th frame of image and the optical flow predicted target area in the N-th frame of image (i.e. performing an Intersection Over Union (IOU for short) matching between the target area in the N-th frame of image and the optical flow predicted target area in the N-th frame of image).

Specifically, in some embodiments of the present disclosure, a cost matrix is calculated based on the overlap (i.e., the IOU) between the target area in the N-th frame of image and the optical flow predicted target area in the N-th frame of image, and then the calculated cost matrix is processed using a weighted Hungarian method to perform the first matching between the target area in the N-th frame of image and the optical flow predicted target area in the N-th frame of image.

For example, there are three target areas A1, B1 and C1 in the target area in the N-th frame of image. Correspondingly, there are three target areas A2, B2 and C2 in the optical flow predicted target areas in the N-th frame of image. Intersection Over Unions (IOU's for short) of the target area A1 and each of the three target areas A2, B2 and C2 in the optical flow predicted target area in the N-th frame of image are calculated respectively. Intersection Over Unions (IOU's for short) of the target B1 and each of the three target areas A2, B2 and C2 in the optical flow predicted target area in the N-th frame of image are calculated respectively. Intersection Over Unions (IOU's for short) of the target area C1 and the three target areas A2, B2 and C2 in the optical flow predicted target area in the N-th frame of image are calculated respectively. Therefore, 9 values are obtained, thus forming a cost matrix. Then, the weighted Hungarian method is used to process the calculated cost matrix, so as to obtain an optimal matching pair between the target area in the N-th frame of image and the optical flow predicted target area in the N-th frame of image.

In some embodiments of the present disclosure, the weighted Hungarian method is used to obtain an optimal matching pair, so that an optimal solution can be obtained for each pair of target areas formed by each target area of the target areas in the N-th frame of image and a corresponding target area in the optical flow predicted target area in the N-th frame of image.

In some embodiments of the present disclosure, the first matching module 5 is further configured to output a target area in the N-th frame of image which passes the first matching (the target area in the N-th frame of image which passes the first matching) to update an Kalman Filter model and perform optical flow point resampling, in response to the target area in the N-th frame of image being matched with the optical flow predicted target area in the N-th frame of image.

In some embodiments of the present disclosure, updating the Kalman Filter model and performing the optical flow point resampling for the matched target area in the N-th frame of image is that, the optical flow calculation is performed on the matched target area in the N-th frame of image to generate an optical flow predicted target area (optical flow predicted result) in the (N+1)-th frame of image, and the Kalman Filter prediction is performed on the matched target area in the N-th frame of image to generate a Kalman Filter predicted target area (Kalman Filter predicted result) in the (N+1)-th frame of image.

In some embodiments of the present disclosure, in response to the unmatch between the target area in the N-th frame of image and the optical flow predicted target area in the N-th frame of image, the first matching module 5 is further configured to output the target area in the N-th frame of image which does not pass the first matching to a second matching module 6. The second matching module 6 is configured to perform second matching between an unmatched target area in the N-th frame of image (the target area in the N-th frame of image which does not pass the first matching) and the Kalman Filter predicted target area in the N-th frame of image from the Kalman prediction module 4.

In some embodiments of the present disclosure, the second matching module 6 is configured to compare an overlap between the unmatched target area in the N-th frame of image and the Kalman Filter predicted target area in the N-th frame of image (i.e. performing IOU matching on the unmatched target area in the N-th frame of image and the Kalman Filter predicted target area in the N-th frame of image).

Specifically, in some embodiments of the present disclosure, a cost matrix is calculated based on the overlap (i.e., the IOU) between the unmatched target area in the N-th frame of image and the Kalman Filter predicted target area in the N-th frame of image, and then the calculated cost matrix is processed using a weighted Hungarian method to perform second matching between the unmatched target area in the N-th frame of image and the Kalman Filter predicted target area in the N-th frame of image.

For example, there are three target areas A1, B1 and C1 in the unmatched target area in the N-th frame of image, and correspondingly, there are three target areas A2, B2 and C2 in the Kalman Filter predicted target area in the N-th frame of image. Intersection Over Unions (IOU's for short) of the target area A1 and each of the three target areas A2, B2 and C2 in the Kalman Filter predicted target area in the N-th frame of image are calculated respectively. Intersection Over Unions (IOU's for short) of the target area B1 and each of the three target areas A2, B2 and C2 in the Kalman Filter predicted target area in the N-th frame of image are calculated respectively. Intersection Over Unions (IOU's for short) of the target area C1 and each of the three target areas A2, B2 and C2 in the Kalman Filter predicted target area in the N-th frame of image are calculated respectively. Therefore, 9 values are obtained, thus forming a cost matrix. Then, the weighted Hungarian method is used to process the calculated cost matrix, so as to obtain an optimal matching pair between the unmatched target area in the N-th frame of image and the Kalman Filter predicted target area in the N-th frame of image.

In some embodiments of the present disclosure, the second matching is mainly to ensure that the IOU matching predicted by the Kalman Filter is still reserved in a case of failure of optical flow point prediction, thereby ensuring a tracking recall rate.

In some embodiments of the present disclosure, associated algorithms used in a sparse optical flow method may be implemented in CUDA™ (Compute Unified Device Architecture), introduced by NVIDIA Corporation. The compute unified device architecture can achieve a dense optical flow prediction method which needs more computation amount and consumes more resources than the sparse optical flow method, and can calculate an optical flow vector at all pixels in the target area and perform optical flow prediction. Furthermore, in order to avoid from a problem that an optical flow is easy to fail at a high speed, the compute unified device architecture can predict the optical flow with a plurality of scales to ensure the accuracy of optical flow prediction and an operational speed of the algorithm.

In some embodiments of the present disclosure, the second matching module 6 is further configured to output the matched target area in the N-th frame of image (the target area in the N-th frame of image which passes the second matching) to update the Kalman Filter model and perform the optical flow point resampling, in response to the target area in the N-th frame of image which does not pass the first matching being matched with the Kalman Filter predicted target area in the N-th frame of image.

In some embodiments of the present disclosure, updating the Kalman Filter model and performing the optical flow point resampling for the matched target area in the N-th frame of image is that, the optical flow calculation is performed on the matched target area in the N-th frame of image to generate an optical flow predicted target area (optical flow predicted result) in the (N+1)-th frame of image, and the Kalman Filter prediction is performed on the matched target area in the N-th frame of image to generate a Kalman Filter predicted target area (Kalman Filter predicted result) in the (N+1)-th frame of image.

In some embodiments of the present disclosure, in response to the unmatch between the target area in the N-th frame of image which does not pass the first matching and the Kalman Filter predicted target area in the N-th frame of image, the second matching module 6 is further configured to output a target area in the N-th frame of image that does not pass both of the first matching and the second matching, to create and initialize a Kalman motion model and to perform optical flow point sampling.

In some embodiments of the present disclosure, the second matching module 6 is further configured to output the unmatched Kalman Filter predicted target area in the N-th frame of image (the Kalman Filter predicted target area in the N-th frame of image which does not pass the second matching) to a determination module 7, the determination module 7 is configured to make a prediction condition determination.

In some embodiments of the present disclosure, the determination module 7 is configured to make a prediction condition determination on an optical flow predicted target area in the N-th frame of image corresponding to the unmatched Kalman Filter predicted target area in the N-th frame of image, wherein the unmatched Kalman Filter predicted target area in the N-th frame of image and the optical flow predicted target area in the N-th frame of image correspond to a same target.

Specifically, in the optical flow predicted result of the optical flow predicted target area in the N-th frame of image, if the optical flow vector at the sampling point calculated by twice of optical flow calculations (i.e., the forward optical flow calculation and the reverse optical flow calculation) is greater than the first distance threshold which is a median value of an error FB [ ] at the prediction point, the optical flow predicted target area in the N-th frame of image corresponding to the unmatched Kalman Filter predicted target area in the N-th frame of image is considered not to meet the prediction condition; if the optical flow vector at the sampling point calculated by the twice of optical flow calculations (i.e., the forward optical flow calculation and the reverse optical flow calculation) is less than the first distance threshold, the optical flow predicted target area in the N-th frame of image corresponding to the unmatched Kalman Filter predicted target area in the N-th frame of image is considered to meet the prediction condition.

Alternatively, in some embodiments of the present disclosure, the optical flow vector in the optical flow predicted target area in the N-th frame of image is calculated, and an optical flow predicted target area in which the optical flow vector is greater than the second distance threshold is deleted. In some embodiments of the present disclosure, if the calculated optical flow vector in the optical flow predicted target area in the N-th frame of image is greater than the second distance threshold, the optical flow predicted target area in the N-th frame of image corresponding to the unmatched Kalman Filter predicted target area in the N-th frame of image is considered not to meet the prediction condition; if the calculated optical flow vector in the optical flow predicted target area in the N-th frame of image is less than the second distance threshold, the optical flow predicted target area in the N-th frame of image corresponding to the unmatched Kalman Filter predicted target area in the N-th frame of image is considered to meet the prediction condition.

In some embodiments of the present disclosure, the determination module 7 is further configured to delete the Kalman motion model in response to a determination that the prediction condition is not met.

In some embodiments of the present disclosure, the Kalman motion model is deleted if the determination is that the prediction condition is not met. However, the present disclosure is not limited thereto. In other embodiments of the present disclosure, if the determination is that the prediction condition is not met, a lifetime of the Kalman motion model is increased by 1. When the lifetime of Kalman motion model is greater than a certain threshold, the Kalman motion model is deleted.

In some embodiments of the present disclosure, in response to the determination being that the prediction condition is met, the determination module 7 is further configured to update the Kalman Filter model and perform the optical flow point resampling by using the optical flow predicted target area in the N-th frame of image corresponding to the unmatched Kalman Filter predicted target area in the N-th frame of image (the Kalman Filter predicted target area in the N-th frame of image which does not pass the second matching).

In some embodiments of the present disclosure, updating the Kalman Filter model and performing the optical flow point resampling by using the optical flow predicted target area in the N-th frame of image corresponding to the unmatched Kalman Filter predicted target area in the N-th frame of image is that, the optical flow calculation is performed on the optical flow predicted target area in the N-th frame of image to generate an optical flow predicted target area (optical flow predicted result) in the (N+1)-th frame of image, and the Kalman Filter prediction is performed on the matched target area in the N-th frame of image to generate a Kalman Filter predicted target area (Kalman Filter predicted result) in the (N+1)-th frame of image.

In some embodiments of the present disclosure, the target detector 2 is a Convolutional Neural Network (CNN for short) target detector.

In some optional implementations of the present embodiment, the target detector 2 may be obtained by training a preset Convolutional Neural Network (CNN for short). The convolution neural network may be a multi-layer convolutional neural network which is untrained or is being trained. The convolutional neural network may include, for example, a convolution layer, a pooling layer, a full connection layer and a loss layer. In addition, a non-first convolution layer in the convolutional neural network may be connected with at least one convolution layer that precedes the non-first convolution layer. For example, the non-first convolution layer may be connected with all convolution layers that precede it to enable selection of a first convolution layer. The non-first convolution layer may be connected with a part of convolution layers that precedes the non-first convolution layer.

In some embodiments of the present disclosure, the camera 1 is further configured to acquire a first frame of image; the target detector 2 is further configured to receive the first frame of image and perform target detection on the first frame of image by the target detection algorithm to generate a target area; the optical flow prediction module 3 is further configured to perform optical flow point sampling on the target area in the first frame of image from the target detector 2, and the Kalman prediction module 4 is further configured to create and initialize a Kalman motion model for the target area in the first frame of image from the target detector 2.

In some embodiments of the present disclosure, the acts described above are performed on each of the N frames of image, where N is an integer greater than or equal to 2, thereby accomplishing tracking for a plurality of targets in a video stream.

In some embodiments of the present disclosure, sufficient correlation of tracking in two adjacent frames can be ensured by performing the second matching.

In some embodiments of the present disclosure, optical flow compensation is performed on the unmatched Kalman Filter predicted target area in the N-th frame of image, and the Kalman Filter model is updated by using the compensated Kalman Filter predicted target area, thereby ensuring the consistency of updating the motion model and improving the tracking stability.

According to the target tracking system provided in the embodiments of the present disclosure, the SORT tracking algorithm and the sparse optical flow method are combined to effectively solve the problem of tracking failure caused by tracking ID switching and missing detection due to the simple IOU matching in the SORT tracking algorithm. At the same time, when detection effect is poor caused by flickers, the problem can also be effectively remedied, thereby improving the tracking stability and making the tracking effect does not rely heavily on the detection effect.

In a third aspect, an electronic device is further provided in one or more embodiments of the present disclosure, which includes a memory, a processor, and a computer program stored on the memory and executable on the processor. The processor executes the program to implement the target tracking method as described in any of the above embodiments.

Figure 4:
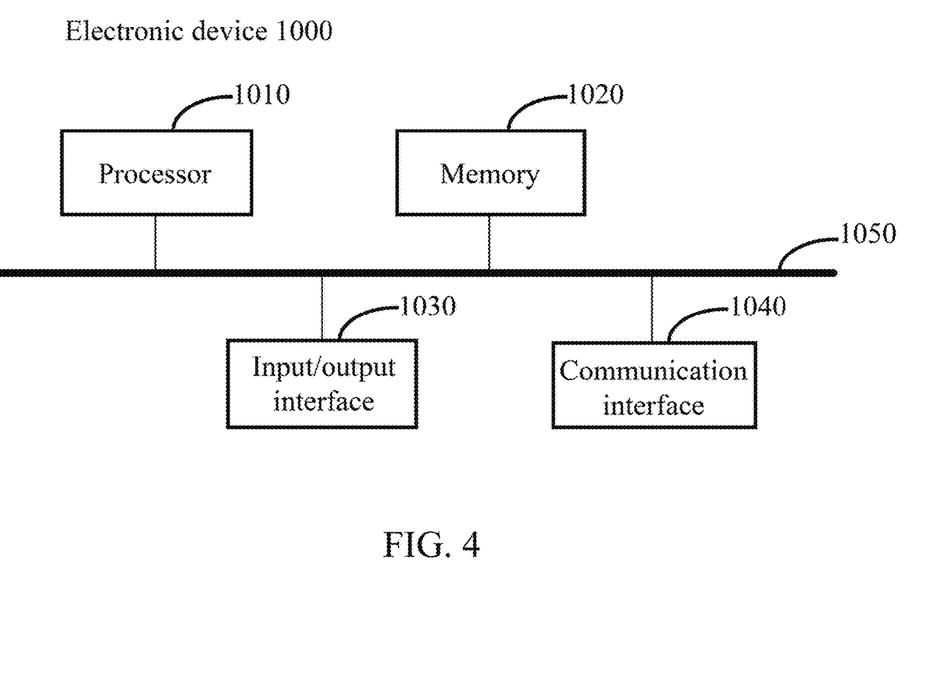
FIG. 4 shows a schematic diagram of a hardware structure of an electronic device according to an embodiment.

FIG. 4 shows a schematic diagram of a hardware structure of an electronic device according to an embodiment. As shown in FIG. 4, an electronic device 1000 may include a processor 1010, a memory 1020, an input/output interface 1030, a communication interface 1040 and a bus 1050. The processor 1010, the memory 1020, the input/output interface 1030, and the communication interface 1040 achieve communication connections among each other inside the electronic device via the bus 1050.

The processor 1010 may be implemented by means of a general Central Processing Unit (CPU for short), a microprocessor, an Application Specific Integrated Circuit (ASIC for short), one or more integrated circuits, or the like, and is configured to execute related programs to implement the target tracking method as described in any of the embodiments of the present disclosure.

The memory 1020 may be implemented in a form of a Read Only Memory (ROM for short), a Random Access Memory (RAM for short), a static storage device, a dynamic storage device, etc. The memory 1020 can store an operating system and other application programs, and when the target tracking method as described in any of the above embodiments is implemented in software or firmware, a related program code is stored in the memory 1020 and invoked for execution by the processor 1010.

The input/output interface 1030 is configured to connect with an input/output module to achieve information input and output. The input/output module may be disposed in an electronic device as a component (not shown in the figure) or externally connected with an electronic device to provide a corresponding function. An input device may include a keyboard, a mouse, a touch screen, a microphone, various sensors, and the like. An output device may include a display, a speaker, a vibrator, an indicator lamp, and the like.

The communication interface 1040 is configured to connect with a communication module (not shown in the figure) to implement communication interaction between the electronic device and another device. The communication module may implement communication in a wired mode (such as a Universal Serial Bus (USB for short), a network cable and the like) or a wireless mode (such as a mobile network, Wireless Fidelity (WiFi for short), Bluetooth and the like).

The bus 1050 is configured to transmit information among various components (for example, the processor 1010, the memory 1020, the input/output interface 1030, and the communication interface 1040) of the electronic device.

It should be noted that, although the above-mentioned electronic device only shows the processor 1010, the memory 1020, the input/output interface 1030, the communication interface 1040, and the bus 1050, in a specific implementation process, the electronic device may further include other components needed for normal operation. Furthermore, it will be understood by those skilled in the art that the above-mentioned electronic device may contain only components needed to implement the target tracking method as described in any of the embodiments of the present disclosure, and not necessarily all components shown in the figure.

A non-transitory computer readable storage medium is further provided in an embodiment of the present disclosure, on which computer-executable instructions are stored, wherein the aforementioned target tracking method is implemented when the instructions are executed by a processor.

Those skilled in the art should understand that the discussion in any of the above embodiments is only exemplary and is not intended to imply that the scope of the present disclosure (including the claims) is limited to these examples; under the inventive concept of the present disclosure, the above embodiments or the technical features in different embodiments may be combined, and the steps may be implemented in any order. There are many other changes in different aspects of one or more embodiments of the present disclosure as described above, which are not provided in details for simplicity.

The flowcharts and block diagrams in the drawings illustrate the architecture, functionality and operation implemented possibly according to systems, methods and electronic devices in various embodiments of the present disclosure. In this regard, each block in the flowcharts or the block diagrams may represent a module, a program segment or part of codes, and the module, the program segment, or the part of codes includes at least one executable instruction used for achieving a specified logical function. It is also to be noted that, in some alternative implementations, the functions marked in the blocks may be implemented in an order different from those marked in the drawings. For example, two sequentially continuous blocks may actually be executed substantially concurrently, or may be executed in a reverse sequence sometimes, which is determined by the involved functions. It should also be noted that, each block in the block diagrams and/or the flowcharts and a combination of the blocks in the block diagrams and/or the flowcharts may be implemented by a dedicated hardware-based system used for executing a specified function or operation, or may be implemented by a combination of dedicated hardware and computer instructions.

The components involved in the embodiments of the present disclosure may be implemented in software or hardware. The described components may be disposed in a processor, for example, each of the components may be a software program disposed in a computer or mobile smart device, or may be an independently configured hardware device. The names of these components do not form any limitation on the units in some cases.

In addition, in order to simplify the description and discussion and in order not to make one or more embodiments of the present disclosure difficult to be understood, well-known power/ground connections with an Integrated Circuit (IC for short) chip and other components may or may not be illustrated in the provided drawings. Moreover, an apparatus may be illustrated in a form of a block diagram in order to avoid obscuring one or more embodiments of the present disclosure, which also considers a following fact, that is, details about implementation modes of apparatuses shown in these block diagrams highly depend on a platform on which one or more embodiments of the present disclosure will be implemented (that is, these details should be fully within a understanding range of those skilled in the art). In the case where specific details (for example, circuits) are set forth to describe exemplary embodiments of the present disclosure, it would be apparent to those skilled in the art that one or more embodiments of the present disclosure may be implemented without these specific details or with changes in these specific details. Therefore, these descriptions should be considered illustrative rather than restrictive.

Although the present disclosure is described in combination with specific embodiments of the present disclosure, many replacements, modifications, and variations of these embodiments are apparent to those skilled in the art according to the previous description. For example, the discussed embodiments may be used for other memory architectures (e.g., a Dynamic RAM (DRAM for short)).

One or more embodiments of the present disclosure are intended to cover all such replacements, modifications, and variations that fall within the broad scope of the appended claims. Therefore, any omission, modification, equivalent replacement, improvement and the like made within the spirit and principle of one or more embodiments of the present disclosure shall be included in the scope of protection of the present disclosure.

The invention claimed is:

1. A target tracking method, comprising acquiring N frames of image sequentially, wherein N is an integer greater than or equal to 2,
wherein the target tracking method further comprises:
performing target detection on an N-th frame of image by a target detection algorithm to generate a target area;
performing optical flow calculation on a target area in an (N−1)-th frame of image to generate an optical flow predicted target area in the N-th frame of image; and
performing Kalman Filter prediction on the target area in the (N−1)-th frame of image to generate a Kalman Filter predicted target area in the N-th frame of image;
performing a first matching between the target area in the N-th frame of image and the optical flow predicted target area in the N-th frame of image;
updating a Kalman Filter model and performing an optical flow point resampling for a target area in the N-th frame of image which passes the first matching, in response to the target area in the N-th frame of image being matched with the optical flow predicted target area in the N-th frame of image;
performing a second matching between the target area in the N-th frame of image which does not pass the first matching and the Kalman Filter predicted target area in the N-th frame of image, in response to the target area in the N-th frame of image being not matched with the optical flow predicted target area in the N-th frame of image;
updating the Kalman Filter model and performing the optical flow point resampling for the target area in the N-th frame of image which passes the second matching, in response to the target area in the N-th frame of image which does not pass the first matching being matched with the Kalman Filter predicted target area in the N-th frame of image;
creating and initializing a Kalman motion model for the target area in the N-th frame of image which does not pass the first matching or the second matching, and performing optical flow point sampling, in response to the target area of the N-th frame in image that does not pass the first matching being not matched with the Kalman Filter predicted target area in the N-th frame of image;
performing prediction condition determination on the Kalman Filter predicted target area in the N-th frame of image which does not pass the second matching;
deleting the Kalman motion model in response to the determination being that the prediction condition is not met; and
updating the Kalman Filter model and performing the optical flow point resampling by using the optical flow predicted target area in the N-th frame of image corresponding to the Kalman Filter predicted target area in the N-th frame of image which does not pass the second matching, in response to the determination being that the prediction condition is met, wherein the Kalman Filter predicted target area in the N-th frame of image which does not pass the second matching and the corresponding optical flow predicted target area in the N-th frame of image correspond to a same target.

2. The target tracking method of claim 1, further comprising:
acquiring a first frame of image;
performing target detection on the first frame of image by the target detection algorithm to generate a target area;
performing the optical flow point sampling on the target area in the first frame of image, and
creating and initializing a Kalman motion model for the target area in the first frame of image.

3. The target tracking method of claim 2, wherein the target detection algorithm is yolov5, SSD, or Faster-RCNN.

4. The target tracking method of claim 2, wherein performing the optical flow calculation on the target area in the (N−1)-th frame of image to generate the optical flow predicted target area in the N-th frame of image comprises:
calculating an optical flow vector at a sampling point in the target area in the (N−1)-th frame of image using a forward optical flow calculation and a reverse optical flow calculation, wherein optical flow vectors less than a first distance threshold are averaged to be an optical flow prediction vector in the optical flow predicted target area in the N-th frame of image.

5. The target tracking method of claim 4, wherein the prediction condition is that the optical flow vector is less than the first distance threshold for the optical flow predicted target area in the N-th frame of image corresponding to the Kalman Filter predicted target area in the N-th frame of image that does not pass the second matching.

6. The target tracking method of claim 2, wherein performing the optical flow calculation on the target area in the (N−1)-th frame of image to generate the optical flow predicted target area in the N-th frame of image comprises:

calculating an optical flow vector in the optical flow predicted target area in the N-th frame of image, and deleting an optical flow predicted target area in which the optical flow vector is greater than the second distance threshold.

7. The target tracking method of claim 6, wherein the prediction condition is that the optical flow vector is less than the second distance threshold for the optical flow predicted target area in the N-th frame of image corresponding to the Kalman Filter predicted target area in the N-th frame of image that does not pass the second matching.

8. The target tracking method of claim 1, wherein performing the first matching between the target area in the N-th frame of image and the optical flow predicted target area in the N-th frame of image comprises:
   comparing an overlap between the target areas in the N-th frame of image and the optical flow predicted target area in the N-th frame of image using an IOU algorithm.

9. The target tracking method of claim 1, wherein performing the second matching between the target area in the N-th frame of image which does not pass the first matching and the Kalman Filter predicted target area in the N-th frame of image comprises:
   comparing an overlap between the target area in the N-th frame of image which does not pass the first matching and the Kalman Filter predicted target area in the N-th frame of image using an IOU algorithm.

10. The target tracking method of claim 1, wherein performing the target detection on the N-th frame of image by the target detection algorithm to generate the target area, comprises:
    performing target detection on the N-th frame of image by a CNN target detector with the target detection algorithm to generate the target area.

11. An electronic device, comprising a memory, a processor, and a computer program stored on the memory and runnable on the processor, wherein when the computer program is executed by the processor, the target tracking method of claim 1 is implemented.

12. A target tracking system, comprising:
    a camera, configured to sequentially acquire N frames of images, wherein N is an integer greater than or equal to 2;
    a target detector, connected with the camera and configured to perform target detection on an N-th frame of image through a target detection algorithm to generate a target area;
    an optical flow prediction module, connected to the camera and the target detector and configured to perform optical flow calculation on a target area in an (N−1)-th frame of image to generate an optical flow predicted target area in the N-th frame of image;
    a Kalman prediction module, connected with the camera and the target detector, and configured to perform Kalman Filter prediction on the target area in the (N−1)-th frame of image to generate a Kalman Filter predicted target area in the N-th frame of image; and
    a first matching module, connected with the target detector, the optical flow prediction module and the Kalman prediction module, and is configured to perform a first matching between the target area in the N-th frame of image from the target detector and the optical flow predicted target area in the N-th frame of image from the optical flow prediction module, wherein:
    in response to the target area in the N-th frame of image being matched with the optical flow predicted target area in the N-th frame of image, the first matching module is further configured to output the target area in the N-th frame of image which passes the first matching to update an Kalman Filter model and perform optical flow point resampling;
    in response to the target area in the N-th frame of image being not matched with the optical flow predicted target area in the N-th frame of image, the first matching module is further configured to output the target area in the N-th frame of image which does not pass the first matching to a second matching module, wherein the second matching module is configured to perform a second matching between the target area in the N-th frame of image which does not pass the first matching and the Kalman Filter predicted target area in the N-th frame of image from the Kalman prediction module;
    in response to the target area in the N-th frame of image which does not pass the first matching being matched with the Kalman Filter predicted target area in the N-th frame of image, the second matching module is further configured to output the target area in the N-th frame of image which passes the second matching, to update the Kalman Filter model and perform the optical flow point resampling;
    in response to the target area in the N-th frame of image which does not pass the first matching being not matched with the Kalman Filter predicted target area in the N-th frame of image, the second matching module is further configured to output the target area in the N-th frame of image which does not passes the first matching and the second matching, to create and initialize a Kalman motion model and perform an optical flow point sampling;
    the second matching module is further configured to output the Kalman Filter predicted target area in the N-th frame of image which does not pass the second matching to a determination module, and the determination module is configured to make a prediction condition determination;
    in response to the determination being that the prediction condition is not met, the determination module is further configured to delete the Kalman motion model;
    in response to the determination being that the prediction condition is met, the determination module is further configured to update the Kalman Filter model and perform the optical flow point resampling by using the optical flow predicted target area in the N-th frame of image which is from the optical flow prediction module and corresponds to the Kalman Filter predicted target area in the N-th frame of image which does not pass the second matching; and
    the Kalman Filter predicted target area in the N-th frame of image which does not pass the second matching and the corresponding optical flow predicted target area in the N-th frame of image correspond to a same target.

13. The target tracking system of claim 12, wherein:
    the camera is further configured to acquire a first frame of image;
    the target detector is further configured to receive the first frame of image and perform target detection on the first frame of image through the target detection algorithm to generate a target area;
    the optical flow prediction module is further configured to perform optical flow point sampling on the target area in the first frame of image from the target detector, and the Kalman prediction module is further configured to create and initialize a Kalman motion model for the target area in the first frame of image from the target detector.

14. The target tracking system of claim 13, wherein the target detection algorithm is yolov5, SSD, or Faster-RCNN.

15. The target tracking system of claim 13, wherein the optical flow prediction module is further configured to:
calculate an optical flow vector at a sampling point in the target area in the (N−1)-th frame of image using a forward optical flow calculation and a reverse optical flow calculation, wherein optical flow vectors less than a first distance threshold is averaged to be an optical flow prediction vector in the optical flow predicted target area in the N-th frame of image.

16. The target tracking system of claim 15, wherein the prediction condition is that the optical flow vector is less than the first distance threshold for the optical flow predicted target area in the N-th frame of image corresponding to the Kalman Filter predicted target area in the N-th frame of image that does not pass the second matching.

17. The target tracking system of claim 13, wherein the optical flow prediction module is further configured to:
calculate an optical flow vector in the optical flow predicted target area in the N-th frame of image, and delete an optical flow predicted target area in which the optical flow vector is greater than a second distance threshold.

18. The target tracking system of claim 17, wherein the prediction condition is that the optical flow vector is less than the second distance threshold for the optical flow predicted target area in the N-th frame of image corresponding to the Kalman Filter predicted target area in the N-th frame of image that does not pass the second matching.

19. The target tracking system of claim 12, wherein the first matching module is further configured to:
compare an overlap between the target area in the N-th frame of image and the optical flow predicted target area in the N-th frame of image using an IOU algorithm.

20. The target tracking system of claim 12, wherein the second matching module is further configured to:
compare an overlap between the target area in the N-th frame of image which does not pass the first matching and the Kalman Filter predicted target area in the N-th frame of image using an IOU algorithm.

* * * * *